US007503314B2

(12) United States Patent
Achor

(10) Patent No.: US 7,503,314 B2
(45) Date of Patent: Mar. 17, 2009

(54) MARINE FUEL VAPOR SEPARATOR WITH VENT CONTROL DEVICE

(75) Inventor: Kyle D. Achor, Monticello, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 79 days.

(21) Appl. No.: 11/538,473

(22) Filed: Oct. 4, 2006

(65) Prior Publication Data

US 2007/0101974 A1 May 10, 2007

Related U.S. Application Data

(60) Provisional application No. 60/727,151, filed on Oct. 14, 2005.

(51) Int. Cl.
*F02M 37/04* (2006.01)
*F16K 24/00* (2006.01)

(52) U.S. Cl. ........................ 123/509; 123/497; 123/518; 123/516; 137/587

(58) Field of Classification Search ................. 123/514, 123/541, 509, 516, 518, 497; 417/205; 137/587; 141/286
See application file for complete search history.

(56) References Cited

U.S. PATENT DOCUMENTS

| | | | | |
|---|---|---|---|---|
| 1,683,338 | A | 9/1928 | Evinrude | |
| 4,753,262 | A | 6/1988 | Bergsma | |
| 5,146,901 | A * | 9/1992 | Jones | 123/516 |
| 5,313,977 | A | 5/1994 | Bergsma et al. | |
| 5,413,137 | A | 5/1995 | Gimby | |
| 5,522,417 | A | 6/1996 | Tomioka et al. | |
| 5,605,175 | A | 2/1997 | Bergsma et al. | |
| 5,647,331 | A | 7/1997 | Swanson | |
| 5,881,698 | A | 3/1999 | Tuckey et al. | |
| 5,950,655 | A | 9/1999 | Benjey | |
| 5,975,116 | A | 11/1999 | Rosas et al. | |
| 6,032,654 | A | 3/2000 | Kato | |
| 6,494,227 | B2 | 12/2002 | Hattori et al. | |
| 6,553,974 | B1 | 4/2003 | Wickman et al. | |
| 6,718,953 | B1 | 4/2004 | Torgerud | |
| 6,779,546 | B2 | 8/2004 | Hattori | |
| 6,857,419 | B1 | 2/2005 | Harvey et al. | |
| 6,941,966 | B2 | 9/2005 | Mori et al. | |
| 7,013,878 | B1 | 3/2006 | Cotton et al. | |
| 7,182,071 | B2 * | 2/2007 | Hansson | 123/514 |

* cited by examiner

*Primary Examiner*—Stephen K Cronin
*Assistant Examiner*—Keith Coleman
(74) *Attorney, Agent, or Firm*—Robert L. Stearns; Dickinson Wright PLLC

(57) ABSTRACT

A fuel supply system for an outboard marine engine includes a vapor separator (28) having a uni-directional vapor vent device (36) for preventing fuel leakage when the engine (12) is tipped on its side. The vapor separator (28) includes an enclosed interior chamber (50) which is filled with liquid fuel by a suction pump. A separate, high pressure pump transfers the liquid fuel from the interior chamber (50) to a fuel injection system (32) of the engine (12). The vapor vent device (36) includes a generally tubular casing having an enclosed top end permeated by an escape passage (84), and a float (94) slidably disposed within the casing (82) for movement toward and away from sealing engagement with the escape passage (84). A spring (98) urges the float (94) toward a sealed condition against the escape passage (84), but is too weak to overcome the weight of the float (94) unless the engine (12) is tipped more than about 25 degrees from vertical, or unless the level of fuel in the interior chamber (50) lifts the float (94).

5 Claims, 8 Drawing Sheets

MARINE FUEL VAPOR SEPARATOR WITH VENT CONTROL DEVICE

CROSS REFERENCE TO RELATED APPLICATIONS

This application claims priority to U.S. provisional application entitled Marine Fuel Vapor Separator with Vent Control Device having Ser. No. 60/727,151 and filed Oct. 14, 2005.

BACKGROUND OF THE INVENTION

1. Field of the Invention

The present invention relates to a fuel vapor separator used in a fuel delivery system of a marine engine for preventing fuel spills when the engine is tipped sideways.

2. Related Art

Small outboard marine engines are usually detachably mounted to the transom of a boat. These engines typically include an integrated fuel system which draws liquid fuel under suction from a can or tank in the boat. The fuel is routed through a vapor separator unit to condense or discharge vapors and then delivered at high pressure to a fuel injection system.

Fuel vapor is a long recognized issue in the marine fuel industry. The fact that fuel is withdrawn from the tank at negative pressure is a main factor. Boat safety regulations require that fuel routed between tank and engine be sucked under a vacuum. This prevents fuel spilling into the boat should the fuel line rupture. However, at such low pressures, the fuel readily vaporizes. This, combined with the high temperatures and jarring conditions, leads to a threat of vapor lock.

Vapor separators are designed to address this excessive vapor issue. In addition to the naturally arising vapors from the vacuum drawing step, heated fuel from the fuel rail is returned to the vapor separator where fuel vapors are condensed back to liquid before the fuel is re-introduced to the high pressure pump and fuel rail. As needed, fuel vapors can be vented to atmosphere or pulled into the engine intake system through a vacuum line connection.

The vapor vent system in most marine vapor separators includes a float activated valve for automatically closing the vent line whenever the fuel level in the separator rises above a predetermined level. This valve prevents liquid fuel from being sucked into the engine through the vacuum line. Additionally, the valve mechanism is designed to close the vent line when the engine is tipped so that liquid fuel does not, through gravity, drain out the vacuum vent line.

Vapor vent valve arrangements in the prior art are commonly constructed according to the float and needle valve principle, in which a buoyant float is supported just below the vapor vent line and connected to a needle valve which closes when the liquid fuel in the vapor separator lifts the float. A typical prior art vent valve system is depicted in FIG. 4. These floats are commonly carried on a pivot pin, with the rotational axis of the float pivot being oriented parallel relative to the pivotal axis of the engine mounting bracket so that the float will close the vent passage whenever the engine is rotated to a tilt (i.e., prop out-of-water) condition. This is important so that liquid fuel does not run out of the engine when it is shut off and tilted into the boat.

Smaller outboard marine engines are often light enough to be manually removed from the boat after use and stored on a trailer, in a vehicle trunk, or perhaps the bed of a pick-up truck. If the outboard marine engine is laid on its side, which would be the intuitive method so as to protect the prop and tiller arm, the pivotal axis of the vent valve mechanism is not likely to permit closure of the float valve. As a consequence, it is possible for liquid fuel to leak from the engine into the vehicle. Accordingly, it would be desirable to have an improved fuel vapor separator in which the vent control device can accommodate engine tippage in non-conventional directions.

Vapor separators are not used in automotive applications because the factors which produce excessive vapors in marine applications are not present. Some automotive emission systems incorporate a so-called "roll-over" vent valve into the fuel tank. However, these systems are passive features of the emission system that simply protect the open vent line to the vapor collection canister. The automotive engine will continue to operate unaffected and without interruption if this roll-over vent valve is disabled or removed. Not so in marine fuel systems, where the vapor vent valve is an active component which will disable the entire engine if not functioning properly. An additional distinction between marine and automotive applications of vapor vent valves is in what they are intended to protect. Automotive roll-over vapor vent valves protect tippage of the fuel tank, whereas marine vent valves protect tippage of the engine-mounted vapor separator.

SUMMARY OF THE INVENTION

The invention comprises a fuel supply system for an outboard marine engine. The fuel supply system includes a vapor separator having an enclosed interior chamber for collecting a volume of liquid fuel and fuel vapors. A suction pump transfers the liquid fuel under negative pressure from a remote fuel tank to the interior chamber of the vapor separator. A high pressure pump transfers liquid fuel under positive pressure from the interior chamber to a fuel injection system of the engine. The vapor separator includes a vent valve device communicating with the interior chamber for permitting the escape of fuel vapors trapped in the interior chamber. The vent valve device includes a generally tubular casing having an enclosed top end permeated by an escape passage. A float is slidably disposed within the casing for movement toward and away from pressing engagement with the escape passage. A sealing feature perfects a fluid and vapor tight seal between the float and the escape passage when the float is pressed thereagainst. The vent valve device further includes a biasing element operatively interposed between the casing and the float for urging the float toward the escape passage.

A fuel supply system according to the subject invention overcomes the shortcomings and disadvantages of the prior art by providing a uni-directional vent valve device for the vapor separator of an outboard marine engine. Thus, the uni-directional nature of the vent valve device prevents liquid fuel leakage from the engine when it is tipped in any direction. Therefore, if the outboard marine engine is laid on its side for transportation, fuel will not leak.

The invention also contemplates a vapor separator including a uni-directional vapor vent device for a fuel supply system for an outboard marine engine. The vapor separator includes an enclosed interior chamber for collecting a volume of liquid fuel and fuel vapors. A top wall encloses the interior chamber and includes a vapor outlet. The vent valve device is disposed in the top wall and communicates with the vapor outlet for permitting the escape of fuel vapors trapped in the interior chamber through the vapor outlet. The vent valve device includes a generally tubular casing having an enclosed top end permeated by an escape passage. A float is slidably disposed within the casing for movement toward and away from pressing engagement with the escape passage. A sealing feature perfects a fluid and vapor tight seal between the float and the escape passage when the float is pressing thereagainst. The vent valve device includes a biasing element operatively interposed between the casing and the float for urging the float toward the escape passage.

Furthermore, the invention contemplates a top wall for a vapor separator as used in a fuel system for an outboard marine engine. The top wall includes a vapor outlet, and a receiving pocket. A vapor passage connects the receiving pocket to the vapor outlet for directing the flow of fuel vapors therethrough. A vent valve device is disposed in the receiving pocket for selectively blocking the escape of fuel vapor and liquid through the vapor outlet. The vent valve device includes a generally tubular casing having an enclosed top end permeated by an escape passage. A float is slidably disposed within the casing for movement toward and away from pressing engagement with the escape passage. The vent valve device includes a biasing element operatively interposed between the casing and the float for urging the float toward the escape passage.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
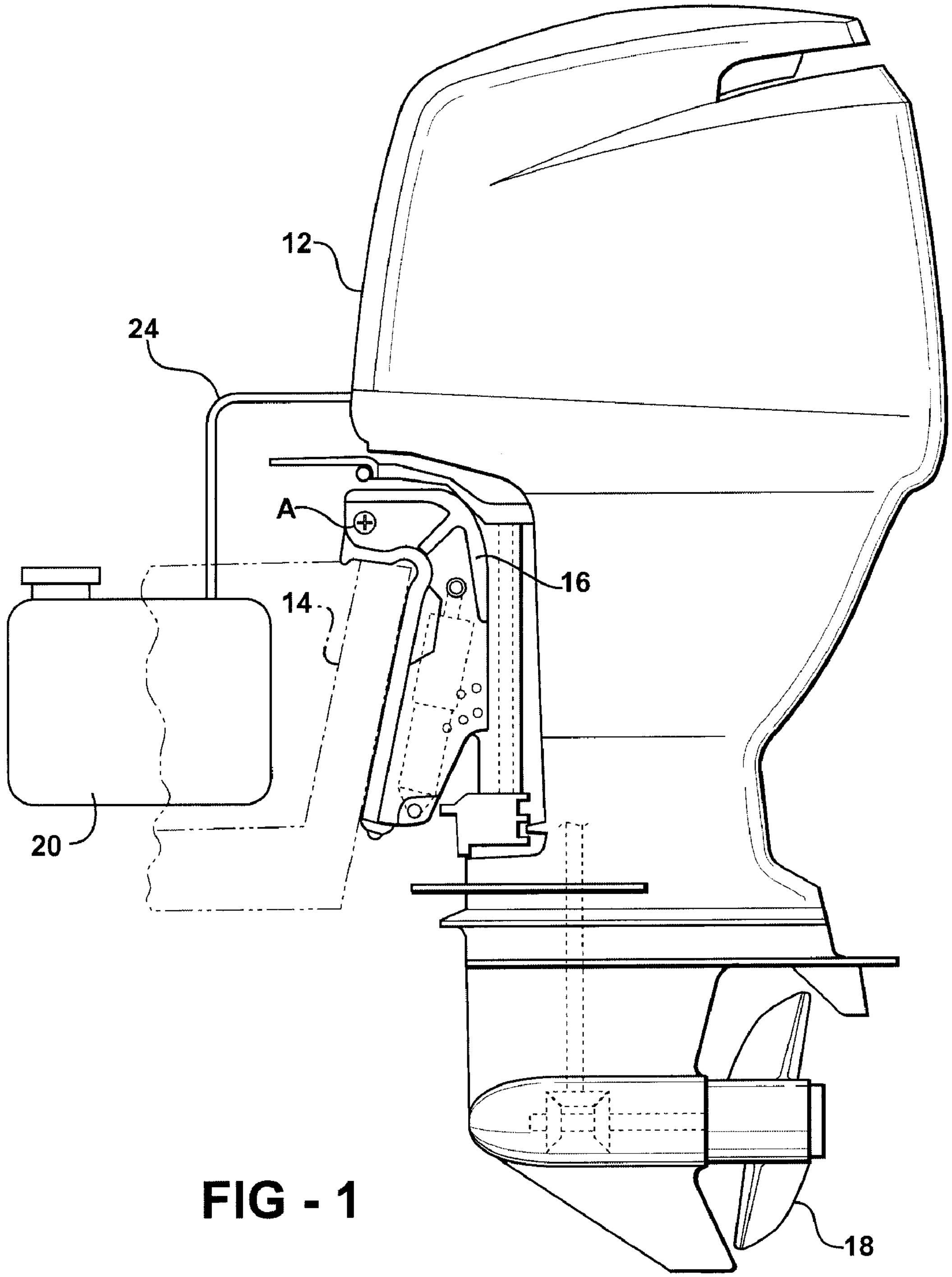
FIG. 1 is a side elevation view of a typical outboard marine engine.

Referring to the Figures, wherein like numerals indicate like or corresponding parts throughout the several views, a general depiction of an outboard marine engine 12 affixed to the transom 14 of a boat is shown in FIG. 1. Small outboard marine engines 12 of this type are usually mounted on a bracket 16 so that the engine 12 can be quickly removed from the boat for transportation and/or maintenance. The bracket 16 includes a tilting feature which allows the motor head to be rotated into the boat, with the propeller 18 swinging up out of the water, to facilitate launching and maneuvering through shallow conditions. As an example, the motor 12 may be pivoted about axis A between these use and non-use positions, as well as for trim control.

Figure 2:
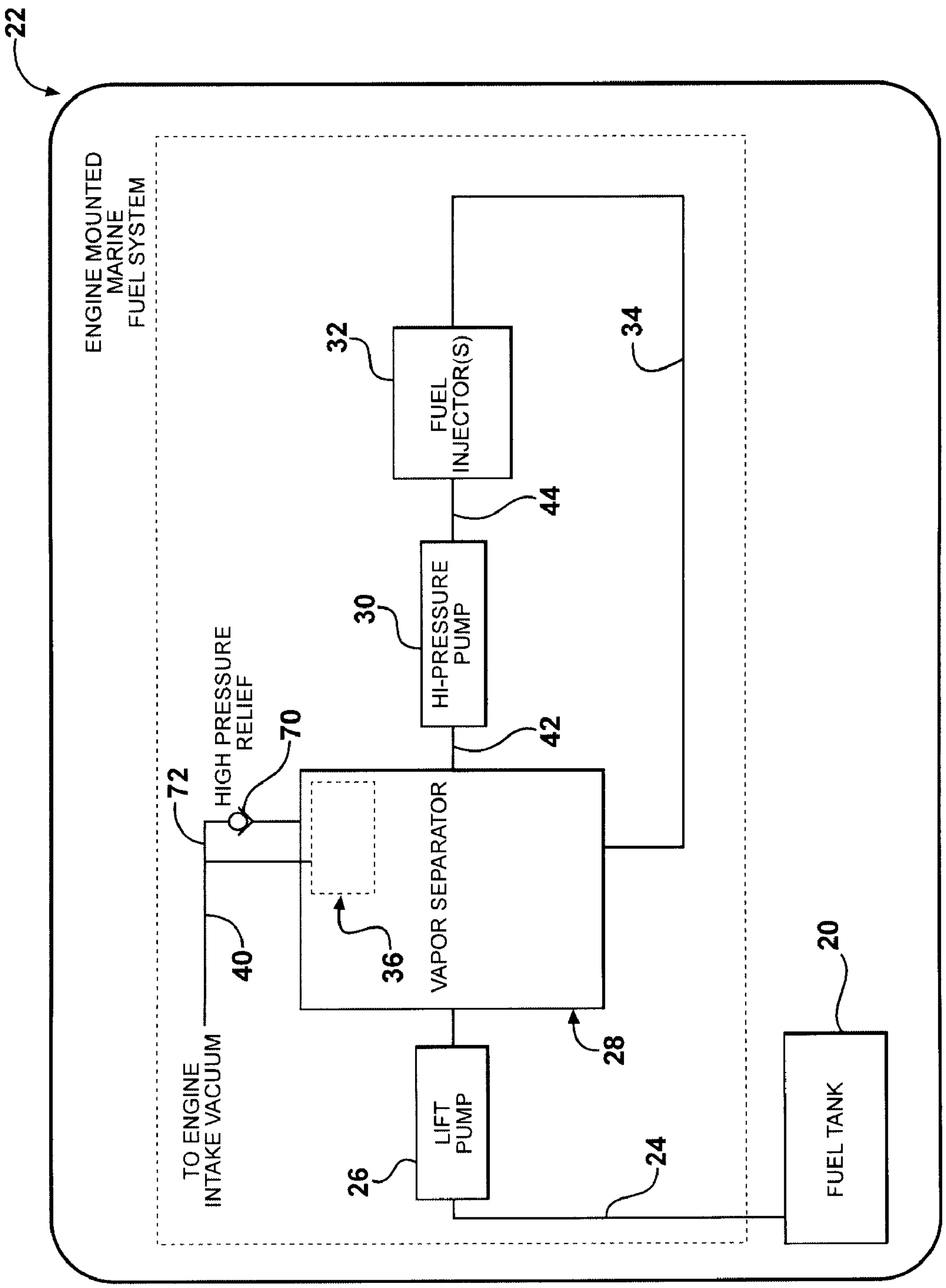
FIG. 2 is a schematic diagram of a fuel delivery system for an outboard marine engine.

An engine of the type shown in FIG. 1 commonly runs on a liquid fuel like gasoline or ethanol. Liquid fuel is drawn from a fuel tank 20 by an engine-mounted marine fuel system, generally shown at 22 in FIG. 2. Except for the fuel tank 20 and a supply line 24, the remainder of the fuel system 22 is fully integrated into the engine 12 so that these components are removed from the boat, together with the engine 12. A low pressure fuel supply pump 26 sucks fuel from the tank 20 through the supply line 24. The fuel is delivered to a vapor separator, generally indicated at 28. The vapor separator 26 collects and discharges vapors given off from the incoming low pressure fuel and also from the hot, agitated fuel returning from the engine 12. A high pressure pump 30 then pumps the fuel under pressure into the fuel injector system 32 to be consumed by the engine. Unused fuel is returned to the vapor separator 28 via return line 34. A vent valve device, generally indicated at 36, is provided with a vacuum fitting 38 for connection to the engine intake vacuum system. The vacuum creates a negative pressure in vent line 40 so that fuel vapors can be cycled through the engine 12.

Figure 3:
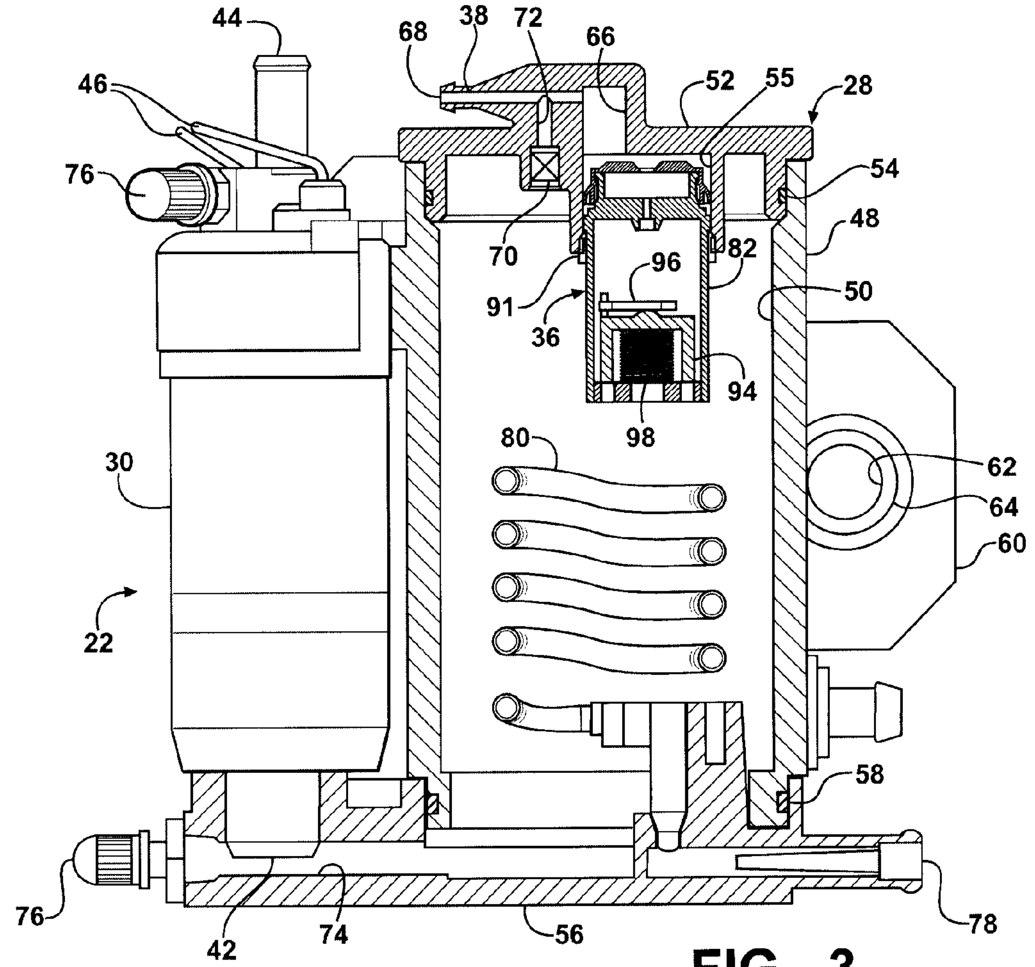
FIG. 3 is a cross-sectional view of a marine vapor separator according to the subject invention.

Referring now to FIG. 3, an exemplary vapor separator 28 is depicted for illustrative purposes. Those of skill will understand that the specific configuration of the vapor separator 28 can take many forms. In this example, the high pressure fuel pump 30 includes a fuel intake 42 at its bottom end and an outlet 44 at its top end leading directly to the fuel injector system 32. Electrical power is supplied to the high pressure pump 30 through wires 46. A schrader valve 76 is provided at the top of pump 30 to allow pressure testing of the outlet pressure. The separator assembly 28 includes a hollow, generally cylindrical housing 48 forming a hollow interior chamber 50. On the top end of the housing 48 is mounted a top wall 52. An O-ring 54 seals the perimeter of the top wall 52 against the top edge of the housing 48 to create a liquid and vapor-tight seal. A socket-like receiving pocket 55 is formed in the underside of the top wall 52 for receiving the vent valve device 36.

Positioned over the bottom end of the housing 48 is a bottom wall 56. An O-ring seal 58 seals the junction between housing 48 and bottom wall 56 to prevent liquid and vapor leakage. The separator assembly 28 also comprises a mounting flange 60 having an opening 62 formed there through for attachment inside the engine 12. A rubber grommet 64 positioned within the opening 62 provides vibration isolation.

Figure 4:
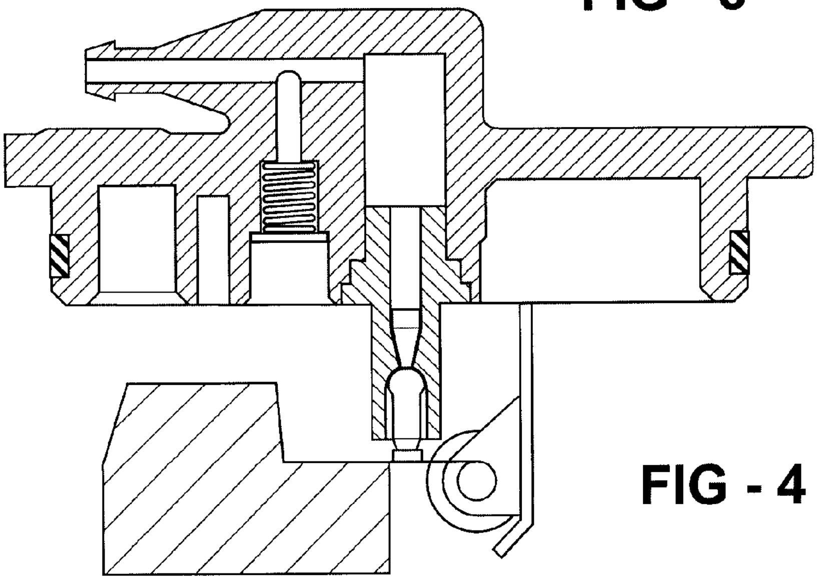
FIG. 4 is a cross-sectional view of a prior art top wall and vent control device.

A vapor passage 66 terminates in a vapor outlet 68 formed through the top wall 52 and as part of the vacuum fitting 38. The receiving pocket 55 communicates with the vapor passage 66. The vapor outlet 68 is connected to the intake manifold of the engine by the vent line 40. Positioned at the lower end of the vapor passage way 66 is the subject vent valve device 36. The vent valve device 36 is distinguished from the prior art constructions such as illustrated in FIG. 4, for example, which characteristically include a needle valve having a needle valve plunger and a needle valve seat. A float assembly is mounted to the needle valve assembly and comprises a support arm and a float attached to one end of float arm. The other end of float arm is pivotally mounted to the support arm by a pivot pin so that the float can pivot up and down. Thus, the needle valve plunger is mounted on the float arm so that when the float is pivoted upwardly, the needle valve plunger closes against the needle valve seat sealing the needle valve. However, when the float pivots downwardly, the needle valve plunger disengages from the needle valve seat, thus opening the valve and allowing vapor and air from the chamber to pass through to the vapor passageway and out the vapor outlet. The pivot pin is oriented so that its axis is generally parallel to the motor tilt axis A, with the needle valve assembly lying generally between the pivot pin and the motor tilt axis A so that when the motor is rotated to a prop out-of-water condition, the needle valve assembly closes.

Referring again to the subject invention as depicted in FIG. 3, the top wall assembly 52 is shown including a pressure relief valve 70 which communicates with the vapor passageway 66 through a passageway 72. The pressure relief valve 70 opens when the pressure within the chamber 50 exceeds a predetermined limit to allow internal air and vapor to escape through the passage 72 and the outlet 68.

The bottom wall 56 has a fuel return inlet connected to a fuel return line 34 (FIG. 2) from the fuel rail 32 of the engine 12 so that excess fuel from the fuel rail 32 is returned into the chamber 50 of the vapor separator assembly 28. The bottom wall assembly 56 also comprises of hollow interior portion 74 which communicates with the internal chamber 50. A schrader valve 76 is positioned at the end of the fuel inlet channel for drainage and pressure release. The fuel inlet 78 from the low pressure pump 26 extends through the bottom wall assembly 56 and communicates with the hollow interior portion 74 of the bottom wall assembly 56. An optional cooling coil 80 is positioned in the chamber 50 and circulates cooling fluid to act as a heat exchanger cooling the fuel contained within the chamber 50 to minimize vaporization.

The problem inherent in prior art vent control configurations, such as the pivoted float assembly depicted in FIG. 4, arises when an engine 12 is laid on its side. When laid on its side, the float pin may not be oriented properly to allow the needle valve to close against the valve seat. As a result, liquid fuel may escape through the vapor passage causing a hazardous spill.

Figure 5:
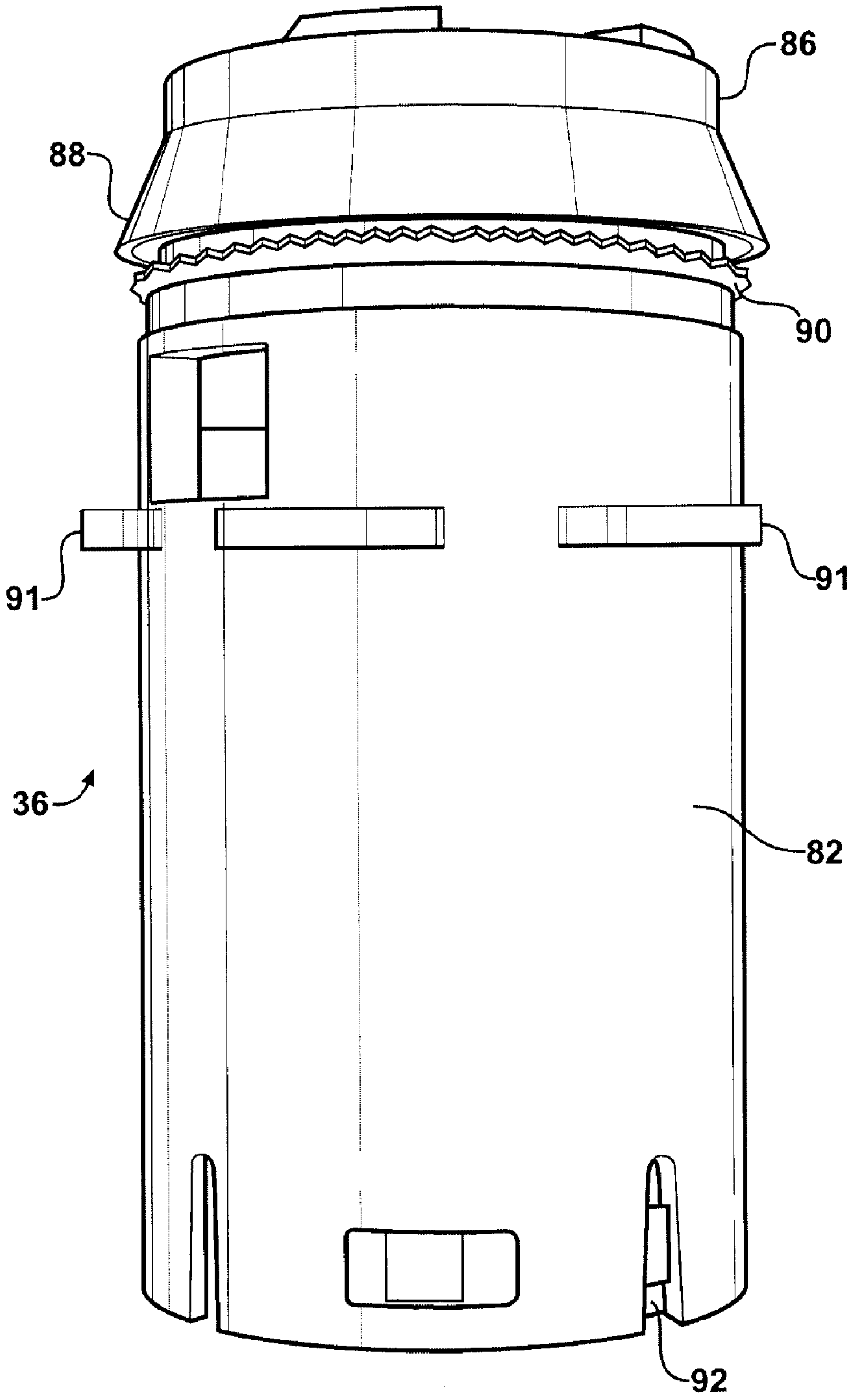
FIG. 5 is a front elevation view of a vent control device.
Figure 7:
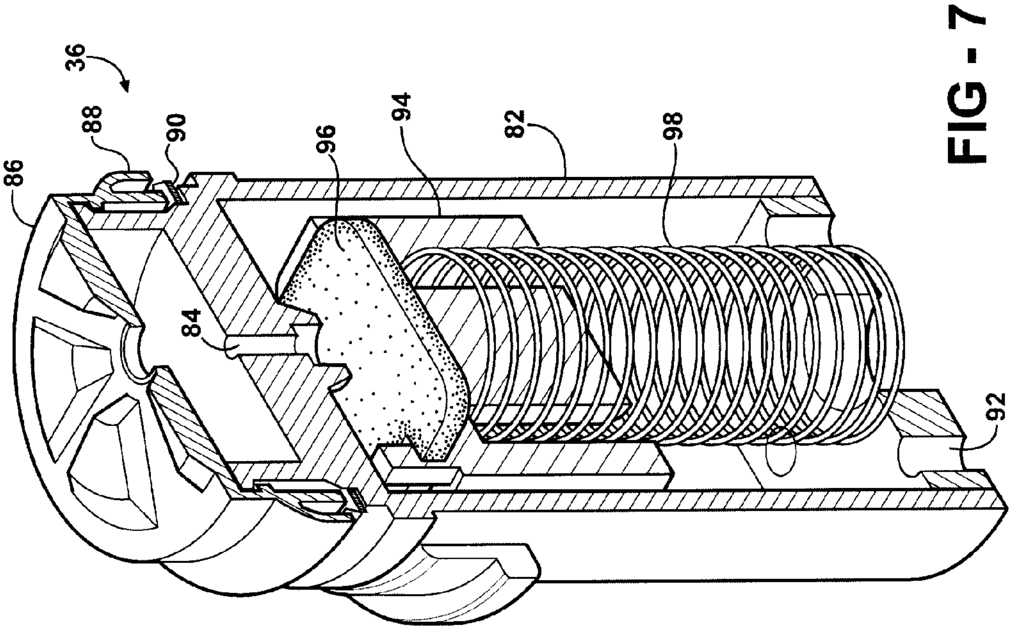
FIG. 7 is a perspective sectional view as in FIG. 6 but showing the float in a closed condition.
Figure 6:
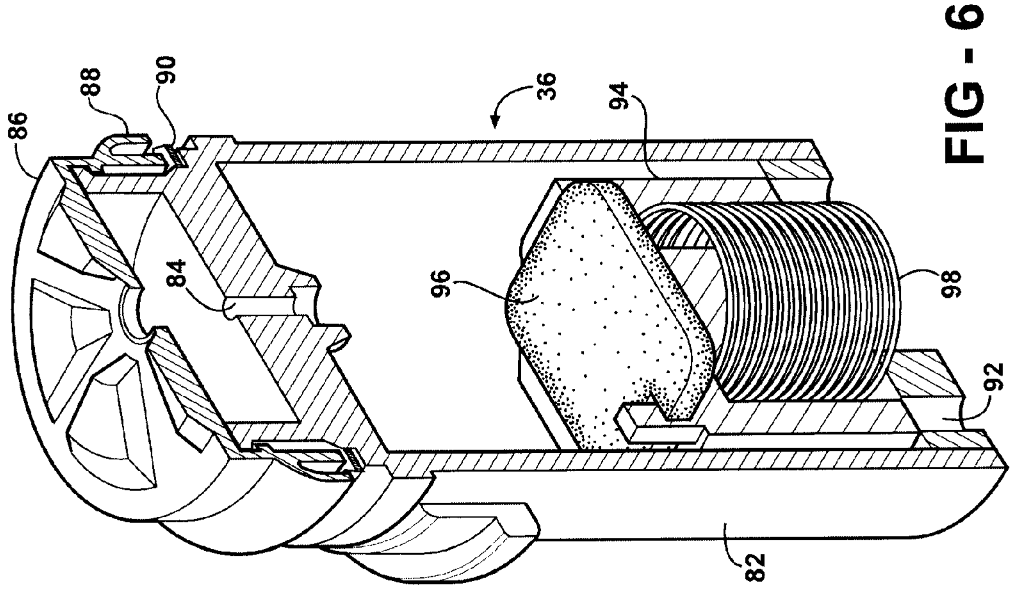
FIG. 6 is a perspective sectional view of the subject vent control device with the float shown in the open condition.
Figure 8:
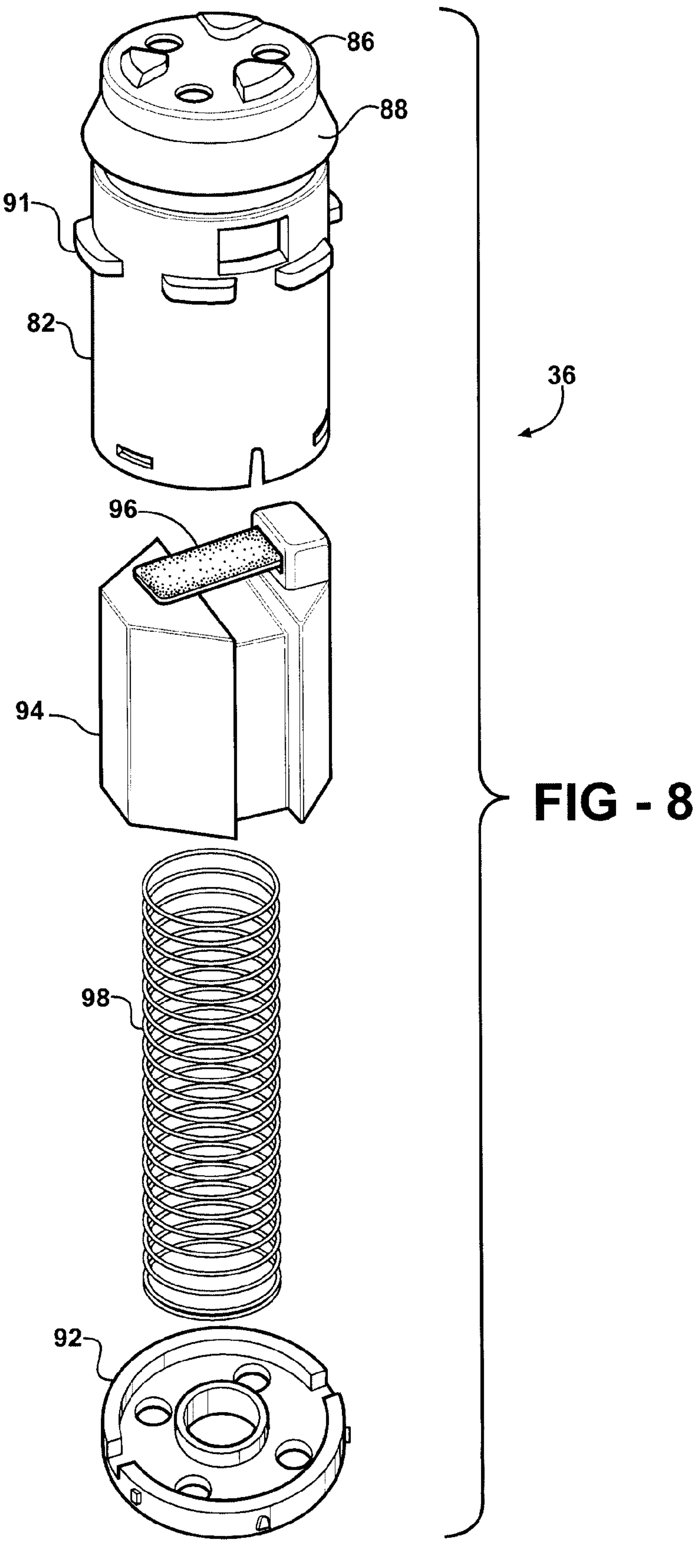
FIG. 8 is an exploded view depicting the component parts of the subject vent control device.

Referring to FIGS. 5-7, the subject vent valve device 36 is shown including a generally tubular, cup-like casing 82 having an open bottom end and a closed top end. Escape passage 84 forms a passageway for the escaping fuel vapors from the top of the casing 82 into the vapor outlet 68. A self-locking cap 86 is affixed to the upper most end of the casing 82 and includes a flexible skirt 88 for developing a fluid and vapor tight seal within the receiving pocket 55. As shown in FIGS. 5 and 8, an optional self-locking retainer ring 90 may be provided to resist disconnection of the vent control device 36 once inserted into the receiving pocket 55. Protrusions 91 on the casing 82 limit the depth into which the cap 86 can be inserted into the receiving pocket 55.

The open bottom end of casing 82 is closed with a perforated plug 92 through which both liquid fuel and fuel vapors are free to pass. A float 94 is free to slide axially within the casing 82 between the escape passage 84 and the plug 92. The float 94 includes a sealing feature which, in the embodiment depicted, comprises a resilient sealing pad 96 adapted to press in sealing contact against the mouth of the escape passage 84. In FIG. 8, the resilient sealing pad 96 and mouth of the escape passage 84 are shown to be formed on a slight angle, relative to the longitudinal sliding direction of the float 94, and are so structured as to mate in full surface-to-surface contact with one another. The float 94 may be keyed to the interior of the casing 82 so that it can only fit within the casing 82 in a particular orientation and cannot rotate as it slides up and down. This keying of the float 94 within the casing 82 is particularly advantageous in situations where the resilient sealing pad 96 is required to seat upon the mouth of the escape passage 84 in a particular orientation like that of the angled configuration shown in FIG. 8. There is ample clearance space between the sides of the float 94 and inner wall of the casing 82 so that vapors flow freely through.

A light biasing element 98, preferably but not necessarily of the coiled compression spring variety, is interposed between the plug 92 and the float 94 for urging the float 94 toward the mouth of the escape passage 84. However, the spring 98 is too weak to overcome the normal gravitational weight of the float 94 in the absence of a buoyant liquid such as fuel. Thus, when the fuel level is below the level of the vent control device 36 within the vapor separator assembly 28, the spring 98 is not strong enough to lift the float 94 away from its full open position as shown in FIGS. 6 and 9.

Figure 9:
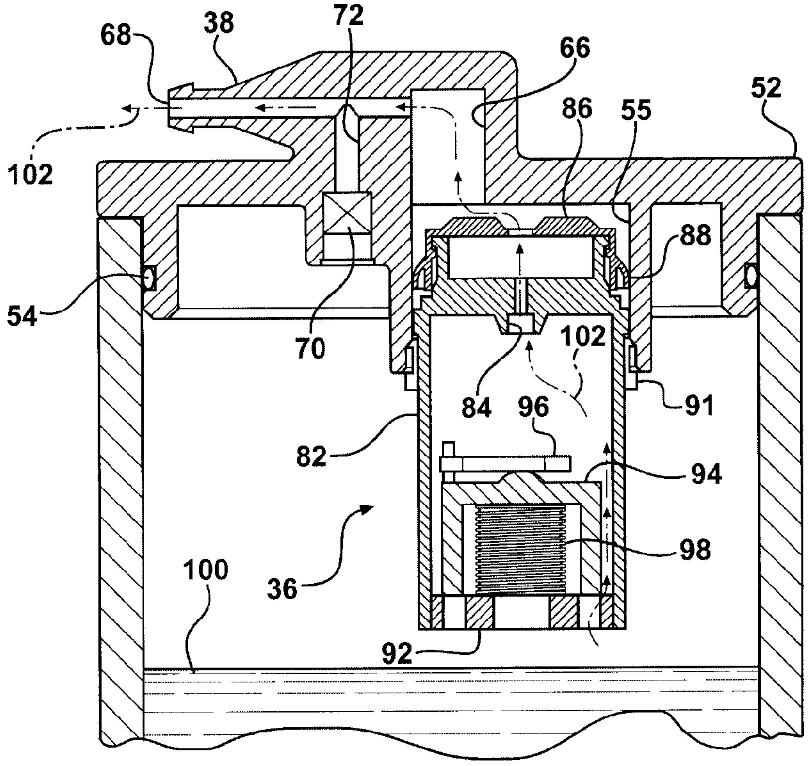
FIG. 9 is a simplified view depicting the venting of fuel vapors through the vent control device when the float is in an open condition.
Figure 10:
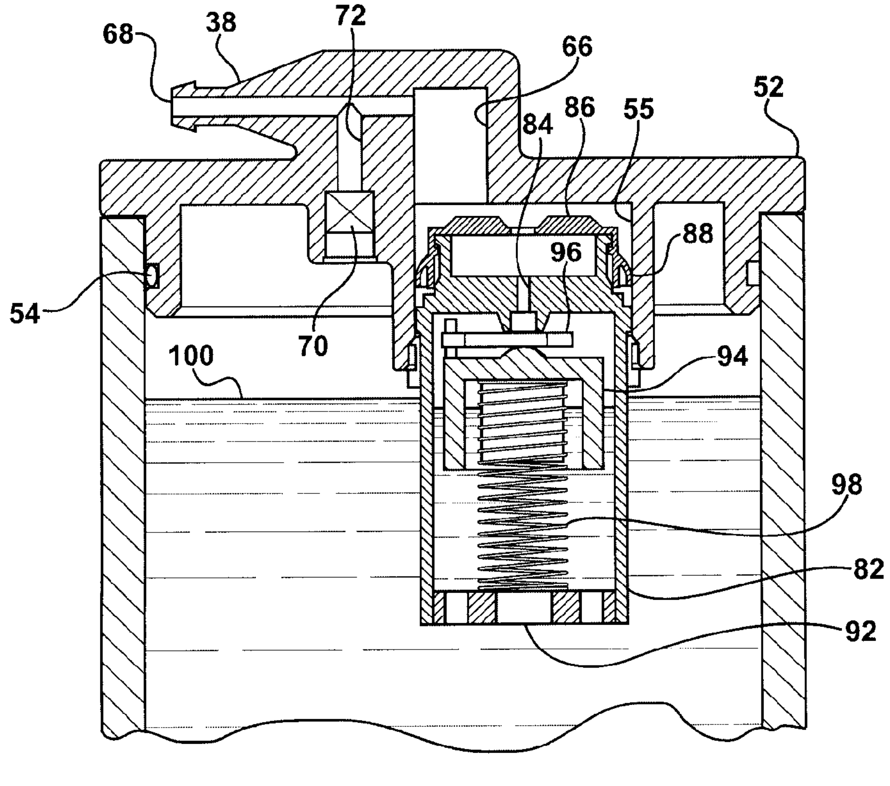
FIG. 10 is a view as in FIG. 9, but showing the float in a closed condition as the result of rising fuel level in the vapor separator.
Figure 11:
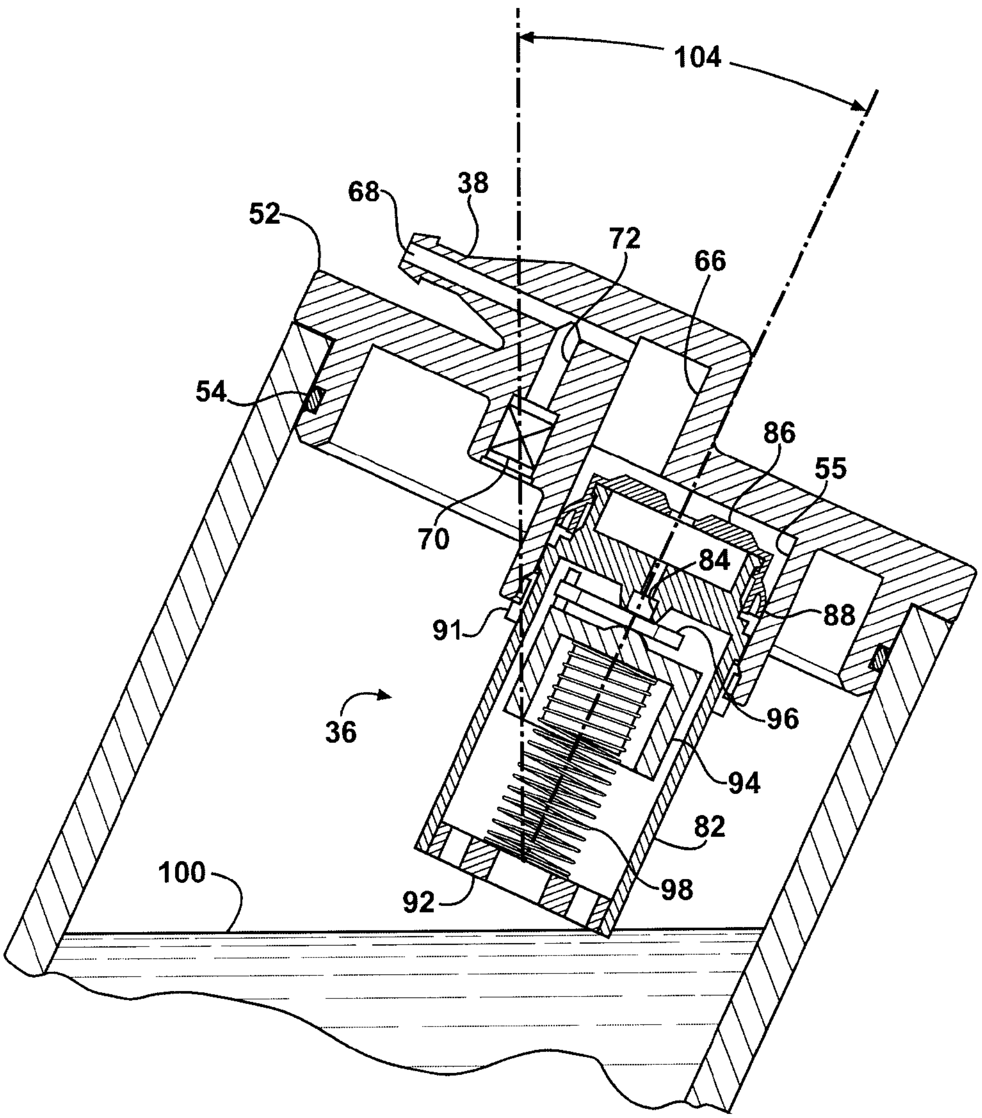
FIG. 11 is a view as in FIGS. 9 and 10, but showing the vapor separator tipped at an approximate twenty-five degree angle and the float moved into the closed condition as the result of the biasing effect of the spring, thus preventing the escape of liquid fuel through the vent valve.

Referring now to FIGS. 9-11, the subject vent control device 36 is shown disposed in the upper fragment of the vapor separator assembly 28. FIG. 9 depicts the condition where the fuel level 100 is lower than the vent control device 36. In this condition, vapor, as depicted by the line 102, is drawn out of the vapor separator assembly 28 under the negative pressure created at the vapor outlet 68. The vapor 102 passes through the porous plug 92, around the ribbed sides of the float 94, through the escape passage 84, through the cap 86 and into the vapor passage 66.

FIG. 10 depicts a condition where the fuel level 100 has risen within the vapor separator assembly 38, thus lifting the float 94 within the casing 82. When the fuel level 100 climbs high enough, the resilient sealing pad 96 atop the float 94 engages the mouth of the escape passage 84, thus closing the vapor passage 66 to any further vapor venting. In this condition, if excess vapor pressure builds within the vapor separator assembly 28, the pressure relief valve 70 will discharge the excessive pressure before a catastrophic failure occurs.

FIG. 11 depicts a condition where the vapor separator assembly 28 is tilted, such as occurs when the engine 12 is stored or otherwise tipped into a non-conventional orientation. Here, the fuel level 100 is shown below the vent valve device 36 such that the float 94 does not receive buoyancy. In this situation, the effect of the light spring 98 becomes critical. As depicted, the normal gravitational weight of the float 94 is separated into x and y vectors, with the y vector comprising the vertical (normal) dimension. The counteracting effect of the spring 98 becomes sufficient at a predetermined angle 104 to automatically move the float 94 toward its closed condition, with the resilient sealing pad 96 pressed against the mouth of the escape passage 84. Thus, even though the fuel level 100 is relatively low within the vapor separator assembly 28, the vent control device 36 is nevertheless closed, thereby shutting a leak path for liquid fuel through the vapor outlet 68. While the angle 104 may be established at generally 25° from vertical, other angular measures may be desirable, and can be predetermined based upon the designed spring force constant of the spring 98.

Accordingly, prior art designs use a float and hinge pin (as in FIG. 4) which mean that the axis of motion for the float needs to be placed as close to parallel to the tilt/trim axis of the engine as possible so that the float will not allow fuel to vent during normal tilted storage of the engine. Sideways tilting of the engine however, such as when the engine is placed in the trunk of a car, cannot assure closure of the vent line and could lead to fuel leakage. Nevertheless, the subject vent valve device 36 functions at any tilted angle as a shut-off valve so that liquid fuel will be prevented from escaping the vapor separator assembly 78 even if the engine 12 is laid on its side. The subject vent control device 36 comprises a self-contained unit that does not depend on a fixed axis for float operation.

Obviously, many modifications and variations of the present invention are possible in light of the above teachings.

It is, therefore, to be understood that within the scope of the appended claims, the invention may be practiced otherwise than as specifically described.

What is claimed is:

1. A fuel supply system for an outboard marine engine, said fuel supply system including:

an outboard marine engine powered by liquid fuel, said engine including a fuel injection system;

a remote fuel tank for containing liquid fuel;

a vapor separator directly affixed to said engine and communicating with said remote fuel tank via a supply line, said vapor separator having an enclosed interior chamber for collecting a volume of liquid fuel and fuel vapors;

a suction pump disposed along said supply line for transferring the liquid fuel under negative pressure from said remote fuel tank to said interior chamber of said vapor separator;

a high pressure pump for transferring liquid fuel under positive pressure from said interior chamber to said fuel injection system of said engine;

said vapor separator including a vent valve device communicating with said interior chamber for permitting the escape of fuel vapors trapped in said interior chamber;

said vent valve device including a generally tubular casing having an enclosed top end permeated by an escape passage, and a float slidably disposed within said casing for movement toward and away from pressing engagement with said escape passage, and a sealing feature for perfecting a fluid and vapor tight seal between said float and said escape passage when said float is pressing thereagainst;

said vent valve device including a biasing element operatively interposed between said casing and said float for urging said float toward said escape passage;

wherein said float has a weight and said biasing element has a reaction force insufficient to overcome said weight force of said float along a normal vector gravitational direction; and said reaction force of said biasing element being sufficient to overcome said weight force of said float along a skewed vector gravitational direction, with said skewed vector displaced greater than about 25 degrees from said normal vector gravitational direction.

2. The system of claim 1 wherein said biasing element comprises a coiled compression spring.

3. The system of claim 1 wherein said vapor separator assembly includes a top wall having a socket-like receiving pocket covering said interior chamber, said vent valve device being disposed in said socket-like receiving pocket of said top wall.

4. The system of claim 3 wherein said vent valve device includes a cap enclosing said top end of said tubular casing, said cap having a resilient, flexible sealing skirt for perfecting a fluid-tight seal within said socket-like receiving pocket of said top wall.

5. The system of claim 3 wherein said vent valve device includes a retainer ring for resisting removal of said vent valve device from said top wall.

* * * * *